(12) United States Patent
Chen

(10) Patent No.: US 7,770,862 B2
(45) Date of Patent: Aug. 10, 2010

(54) ROTATABLE SUPPORT MECHANISM AND ELECTRONIC DEVICE USING THE SAME

(75) Inventor: Ku-Feng Chen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 12/128,629

(22) Filed: May 29, 2008

(65) Prior Publication Data
US 2009/0026339 A1 Jan. 29, 2009

(30) Foreign Application Priority Data
Jul. 27, 2007 (TW) .............................. 96127466 A

(51) Int. Cl.
*F16M 13/00* (2006.01)
(52) U.S. Cl. .................. 248/351; 248/188.91; 248/462; 40/747; 361/679.21
(58) Field of Classification Search ................ 248/335, 248/351, 188.1, 188.91, 447, 457, 462, 472; 361/679.06, 679.21, 679.22; 40/747, 748
See application file for complete search history.

(56) References Cited
U.S. PATENT DOCUMENTS

| | | | | |
|---|---|---|---|---|
| 1,001,403 A | * | 8/1911 | Hipwell et al. ................. 40/747 |
| 3,343,777 A | * | 9/1967 | Becker ........................ 248/455 |
| 5,329,712 A | * | 7/1994 | Keller ........................... 40/747 |
| 5,720,465 A | * | 2/1998 | Peltzer et al. ................ 248/453 |
| 6,003,260 A | * | 12/1999 | Chang .......................... 40/748 |
| 6,189,842 B1 | * | 2/2001 | Bergeron et al. ......... 248/125.1 |
| 6,651,943 B2 | * | 11/2003 | Cho et al. ................. 248/122.1 |
| 6,966,532 B2 | * | 11/2005 | Ishizaki et al. ........... 248/274.1 |
| 7,320,195 B1 | * | 1/2008 | Kushner ....................... 40/781 |
| 7,391,606 B2 | * | 6/2008 | Chen et al. ............. 361/679.27 |
| 2009/0223102 A1 | * | 9/2009 | Li et al. ......................... 40/763 |
| 2010/0012809 A1 | * | 1/2010 | Zeng et al. .................. 248/351 |

* cited by examiner

*Primary Examiner*—Anita M King
(74) *Attorney, Agent, or Firm*—Jianq Chyun IP Office

(57) ABSTRACT

A rotatable support mechanism is attached to a body of an electronic device for upholding the body on a plane and adjusting relative positions between the body and the plane. The rotatable support mechanism includes a base, a rotatable disk, and an elastic stopper. The base attached to the body of the electronic device has an axle. The rotatable disk has a holder and a groove. The axle passes a sidewall of the groove. The rotatable disk rotates around the axle as an axis. The sidewall of the groove has at least an opening. The elastic stopper mounted to the axle has an elastic shell fragment and does not rotate with the disk. As the disk is rotated, the elastic shell fragment enters and passes through the opening to exert a resistance force to the disk. Therefore, the electronic device is upheld vertically or horizontally by the rotatable support mechanism.

10 Claims, 4 Drawing Sheets

ROTATABLE SUPPORT MECHANISM AND ELECTRONIC DEVICE USING THE SAME

CROSS-REFERENCE TO RELATED APPLICATION

This application claims the priority benefit of Taiwan application serial no. 96127466, filed on Jul. 27, 2007. The entirety of the above-mentioned patent application is hereby incorporated by reference herein and made a part of specification.

BACKGROUND OF THE INVENTION

1. Field of the Invention

The present invention relates to a support mechanism, and more particularly to a rotatable support mechanism installed into an electronic device for adjusting the position and the direction where the electronic device is placed.

2. Description of Related Art

With great advance in flat panel displaying techniques, flat panel displays are applicable to various products including a digital photo frame. A bracket of the digital photo frame is generally arranged in a fixed direction, and thus the position and the direction where a frame body of the digital photo frame is placed are restricted. In order for the digital photo frame to properly perform a display function, upholding the frame body of the digital photo frame vertically or horizontally is necessitated. However, said demand for upholding the frame body of the digital photo frame in various directions cannot be satisfied by the conventional support arranged in the fixed direction.

SUMMARY OF THE INVENTION

The present invention is directed to a rotatable support mechanism suitable for being attached to an electronic device and equipped with a function of placing the electronic device in various directions.

The present invention is further directed to an electronic device equipped with a rotatable support mechanism capable of placing the electronic device in various directions.

The present invention provides a rotatable support mechanism attached to a body of an electronic device for upholding the electronic device on a plane with respect to the center of gravity of the body and for adjusting the relative positions between the body and the plane. The rotatable support mechanism includes a base, a rotatable disk, and an elastic stopper. The base is attached to the body and has an axle. The rotatable disk has a holder and a groove, and the axle passes a sidewall of the groove. The rotatable disk rotates around the axle as an axis. The sidewall of the groove has at least an opening. The elastic stopper is mounted to the axle and has an elastic shell fragment. The elastic stopper does not rotate with the rotatable disk. As the rotatable disk is rotated, the elastic shell fragment enters and passes through the opening to exert a resistance force to the rotatable disk.

According to an embodiment of the present invention, the groove accommodates the elastic stopper.

According to an embodiment of the present invention, the rotatable support mechanism further includes a first rotatable stopper and a second rotatable stopper. The first rotatable stopper is fittingly mounted to the base. The second rotatable stopper is fittingly mounted to the rotatable disk for controlling a rotation angle of the rotatable disk relative to the base in line with the first rotatable stopper.

According to an embodiment of the present invention, the holder is extended from the rotatable disk to a direction away from the axle and the base.

According to an embodiment of the present invention, the rotatable support mechanism further includes a cap nut screwed on a segment of an external thread of the axle for forcing the elastic stopper to exert an elastic force to the rotatable disk.

According to an embodiment of the present invention, the rotatable support mechanism further includes one or more constant force washers mounted to the axle and located between the cap nut and the elastic stopper for adjusting a force required by rotating the rotatable disk.

The present invention further provides an electronic device including a body and a rotatable support mechanism. The rotatable support mechanism includes a base, a rotatable disk, and an elastic stopper. The base is attached to the body and has an axle. The rotatable disk has a holder and a groove, and the axle passes a sidewall of the groove. The rotatable disk rotates around the axle as an axis. The sidewall of the groove has at least an opening. The elastic stopper is mounted to the axle and has at least an elastic shell fragment. The elastic stopper does not rotate with the rotatable disk. As the rotatable disk is rotated, the elastic shell fragment enters and passes through the opening to exert a resistance force to the rotatable disk.

According to an embodiment of the present invention, the groove accommodates the elastic stopper.

According to an embodiment of the present invention, the electronic device further includes a first rotatable stopper and a second rotatable stopper. The first rotatable stopper is fittingly mounted to the base. The second rotatable stopper is fittingly mounted to the rotatable disk for controlling a rotation angle of the rotatable disk relative to the base in line with the first rotatable stopper.

According to an embodiment of the present invention, the holder is extended from the rotatable disk to a direction away from the axle and the base.

According to an embodiment of the present invention, the rotatable support mechanism further includes a cap nut screwed on a segment of an external thread of the axle for forcing the elastic stopper to exert an elastic force to the rotatable disk.

According to an embodiment of the present invention, the rotatable support mechanism further includes one or more constant force washers mounted to the axle and located between the cap nut and the elastic stopper for adjusting a force required by rotating the rotatable disk.

The present invention further provides a rotatable support mechanism attached to a body of an electronic device for upholding the electronic device on a plane with respect to the center of gravity of the body and for adjusting the relative positions between the body and the plane. The rotatable support mechanism includes a base, a rotatable disk, a first rotatable stopper, and a second rotatable stopper. The base is attached to the body of the electronic device and has an axle. The rotatable disk rotates around the axle as an axis and has a holder. The first rotatable stopper is fittingly mounted to the base. The second rotatable stopper is fittingly mounted to the rotatable disk for controlling a rotation angle of the rotatable disk relative to the base in line with the first rotatable stopper.

According to an embodiment of the present invention, the rotatable disk has a groove. The axle passes a sidewall of the groove, and the sidewall of the groove includes at least an opening.

According to an embodiment of the present invention, the rotatable support mechanism further includes an elastic stopper mounted to the axle and having at least an elastic shell fragment. The elastic stopper does not rotate with the rotatable disk. As the rotatable disk is rotated, the elastic shell fragment enters and passes through the opening to exert a resistance force to the rotatable disk.

According to an embodiment of the present invention, the groove accommodates the elastic stopper.

According to an embodiment of the present invention, the holder is extended from the rotatable disk to a direction away from the axle and the base.

According to an embodiment of the present invention, the rotatable support mechanism further includes a cap nut screwed on a segment of an external thread of the axle for forcing the elastic stopper to exert an elastic force to the rotatable disk.

According to an embodiment of the present invention, the rotatable support mechanism further includes one or more constant force washers mounted to the axle and located between the cap nut and the elastic stopper for adjusting a force required by rotating the rotatable disk.

The present invention further provides an electronic device including a body and a rotatable support mechanism. The rotatable support mechanism includes a base, a rotatable disk, a first rotatable stopper, and a second rotatable stopper. The base is attached to the body and has an axle. The rotatable disk rotates around the axle as an axis and has a holder. The first rotatable stopper is fittingly mounted to the base. The second rotatable stopper is fittingly mounted to the rotatable disk for controlling a rotation angle of the rotatable disk relative to the base in line with the first rotatable stopper.

According to an embodiment of the present invention, the rotatable disk has a groove. The axle passes a sidewall of the groove, and the sidewall of the groove includes at least an opening.

According to an embodiment of the present invention, the rotatable support mechanism further includes an elastic stopper mounted to the axle axially but not pivotably. The elastic stopper has at least an elastic shell fragment and does not rotate with the rotatable disk. As the rotatable disk is rotated, the elastic shell fragment enters and passes through the opening to exert a resistance force to the rotatable disk.

According to an embodiment of the present invention, the groove accommodates the elastic stopper.

According to an embodiment of the present invention, the holder is extended from the rotatable disk to a direction away from the axle and the base.

According to an embodiment of the present invention, the rotatable support mechanism further includes a cap nut screwed on a segment of an external thread of the axle for forcing the elastic stopper to exert an elastic force to the rotatable disk.

According to an embodiment of the present invention, the rotatable support mechanism further includes one or more constant force washers mounted to the axle and located between the cap nut and the elastic stopper for adjusting a force required by rotating the rotatable disk.

In the rotatable support mechanism and the electronic device applying the rotatable support mechanism proposed in the present invention, the holder of the rotatable disk is adopted for implementing a rotating operation. Moreover, the electronic device is fittingly placed in a desirable direction and at a satisfactory angle on account of the design of combining two of the rotatable stoppers and/or the elastic stopper. Thereby, the electronic device is apt to be upheld vertically or horizontally. Said design is especially adapted to the electronic device including the digital photo frame or the flat panel display for complying with the demand for upholding the electronic device in a vertical manner or a horizontal manner.

In order to make the aforementioned and other objects, features and advantages of the present invention comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
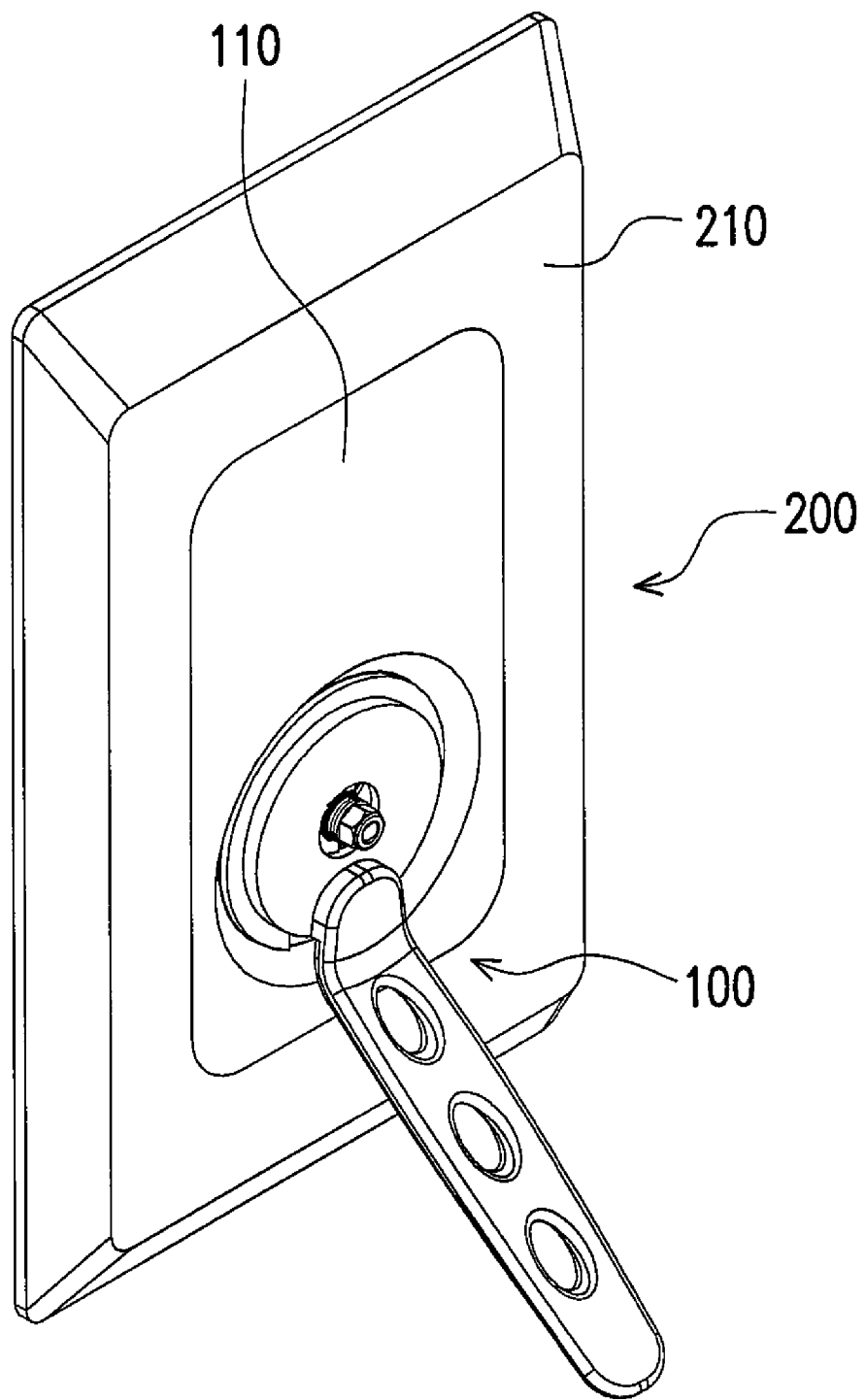
FIGS. 1A through 1C are schematic three-dimensional views illustrating a rotatable support mechanism and an electronic device applying the rotatable support mechanism which are placed in different manners according to an embodiment of the present invention.
Figure 1B:
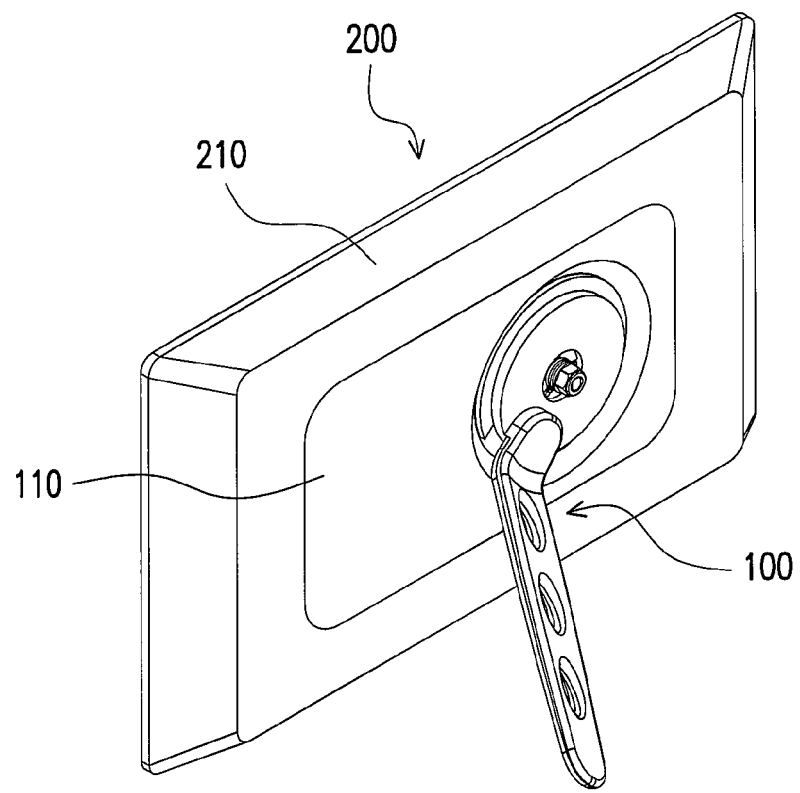
Figure 1C:
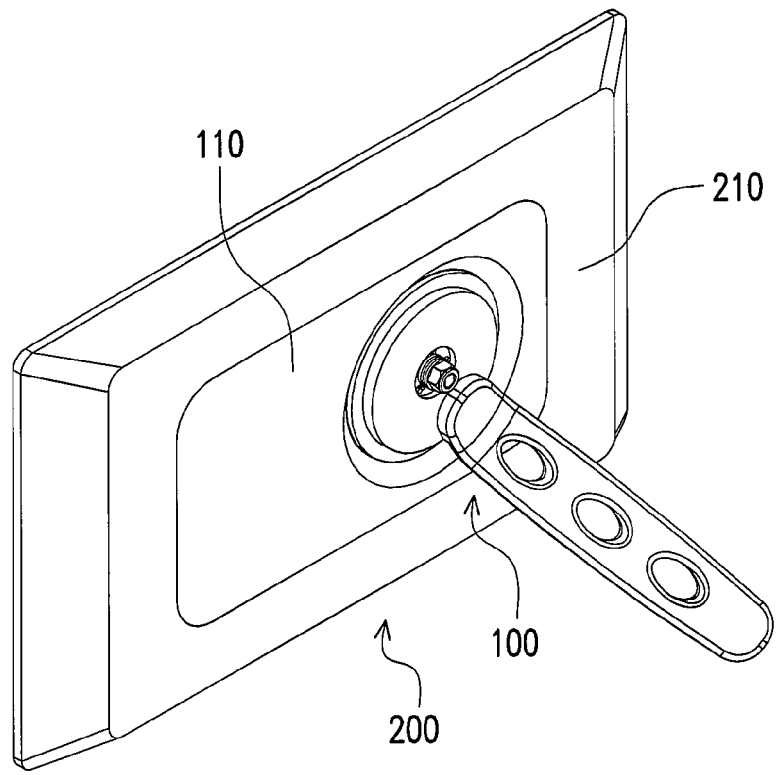

FIGS. 1A through 1C are schematic three-dimensional views illustrating a rotatable support mechanism and an electronic device applying the rotatable support mechanism which are placed in different manners according to an embodiment of the present invention. Referring to FIGS. 1A through 1C, the present invention provides an electronic device 200 including a body 210 and a rotatable support mechanism 100 mounted to the body 210. The rotatable support mechanism 100 is capable of upholding the body 210 on a plane with respect to the center of gravity of the body 210 and adjusting the relative positions between the body 210 and the plane.

Figure 2:
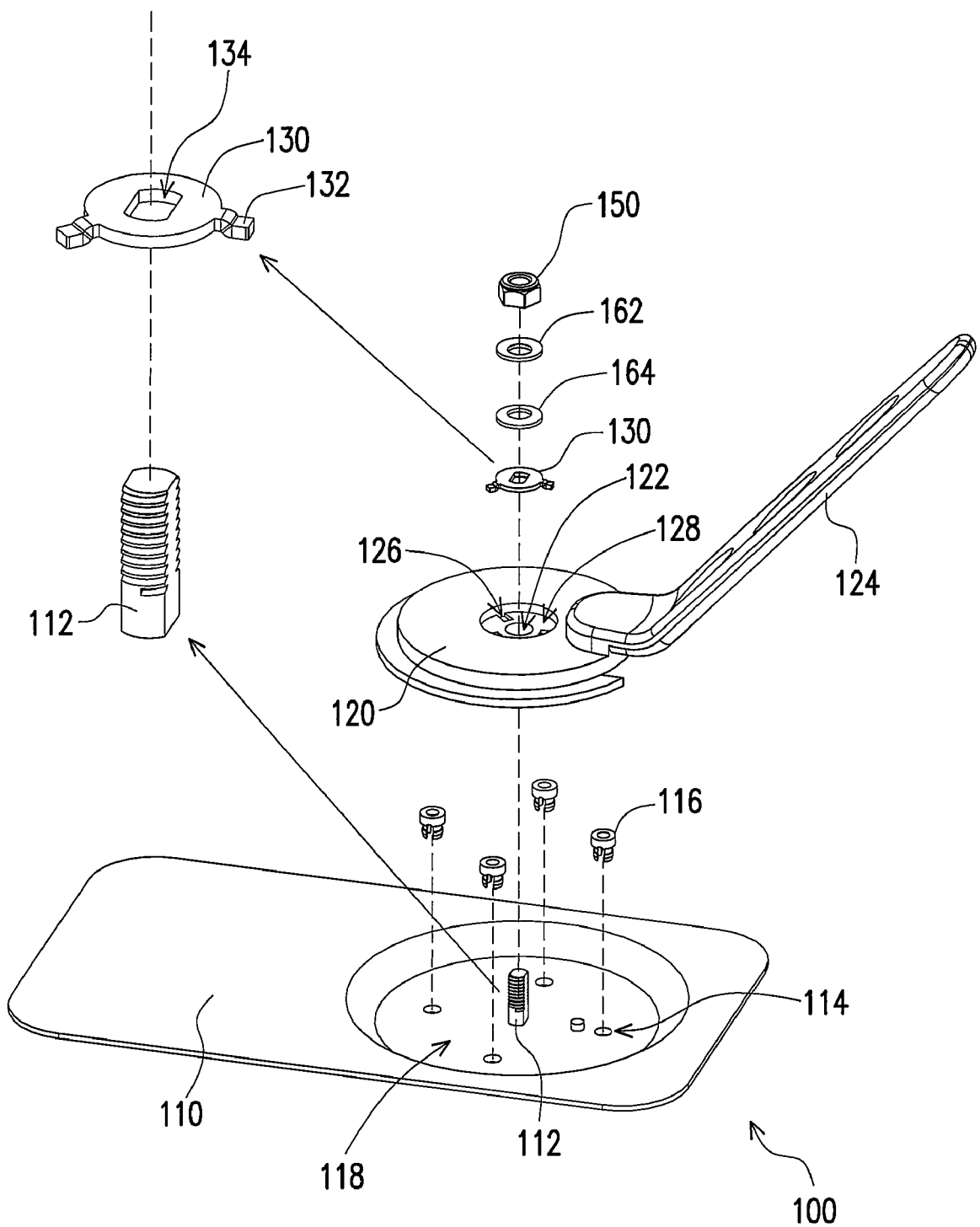
FIG. 2 is an exploded view illustrating components of the rotatable support mechanism depicted in FIG. 1A.

FIG. 2 is an exploded view illustrating components of the rotatable support mechanism depicted in FIG. 1A. Referring to FIG. 2, the rotatable support mechanism 100 includes a base 110 attached to the body 210. In the present embodiment, the base 110 is equipped with a plurality of through holes 114 by which the base 110 is assembled to the body 210 of the electronic device 200 together with the use of a plurality of fixing components 116, such as screws. Moreover, the base 110 further includes an axle 112, an end of which is fittingly mounted to a bottom of a receptacle 118.

The rotatable support mechanism 100 further includes a rotatable disk 120 rotating around the axle 112 as an axis. In the present embodiment, the axle 112 passes the rotatable disk 120 through an axle hole 122.

Additionally, the rotatable disk 120 has a holder 124 extended from the rotatable disk 120 to a direction away from the axle 112 and the base 110. The holder 124 serves as a support for upholding the body 210 of the electronic device 200. According to the present embodiment, the holder 124 and the rotatable disk 120 can be integrally formed. Besides, the rotatable disk 120 further includes a groove 128. The axle 112 passes a sidewall of the groove 128, and the sidewall of the groove 128 has a plurality of openings 126.

The rotatable support mechanism 100 further includes an elastic stopper 130 mounted to the axle 112 and accommodated in the groove 128. The elastic stopper 130 does not rotate with the rotatable disk 112. In the present embodiment, a buckle hole 134 of the elastic stopper 130 is designed in accordance with the shape (e.g. a chamfer cylinder with two flat surfaces at two sides) of a segment of the axle 112, wherein the segment of the axle 112 is away from the base 110. As such, the elastic stopper 130 is unpivotably mounted to the axle 112.

In addition, the elastic stopper 130 further includes a plurality of elastic shell fragments 132. The openings 126 of the groove 128 are distributed to moving paths of the elastic shell fragments 132 on the rotatable disk 120, so as to modify an elastic force exerted by the elastic shell fragments 132 to the rotatable disk 120. Note that the elastic shell fragments 132 tend to stay within the openings 126 for releasing the elastic force as a resistance force exerted to the rotatable disk 120. Hence, by means of determining the positions of the openings 126, the rotatable disk 120 is rotated to one of certain fixed angles relative to the base 110.

The rotatable support mechanism 100 further includes a cap nut 150 screwed on a segment of an external thread of the axle 112 for forcing the elastic shell fragments 132 of the elastic stopper 130 to relatively exert the elastic force to the rotatable disk 120. Furthermore, the rotatable support mechanism 100 has one or more constant force washers 162 and 164 sequentially mounted to the axle 112 and located between the cap nut 150 and the elastic stopper 130 for adjusting a force required by rotating the rotatable disk 120.

Aside from the certain angles, the rotatable disk 120 can be rotated to any fixed angle with respect to the base 110 when the elastic shell fragments 132 are located outside the openings 126. Thereby, the holder 124 is adjusted to any corresponding position relative to the base 110. As such, an elevation angle of the body 210 relative to the plane where the body 210 is located can be arbitrarily changed, as illustrated in FIGS. 1B and 1C.

Figure 3A:
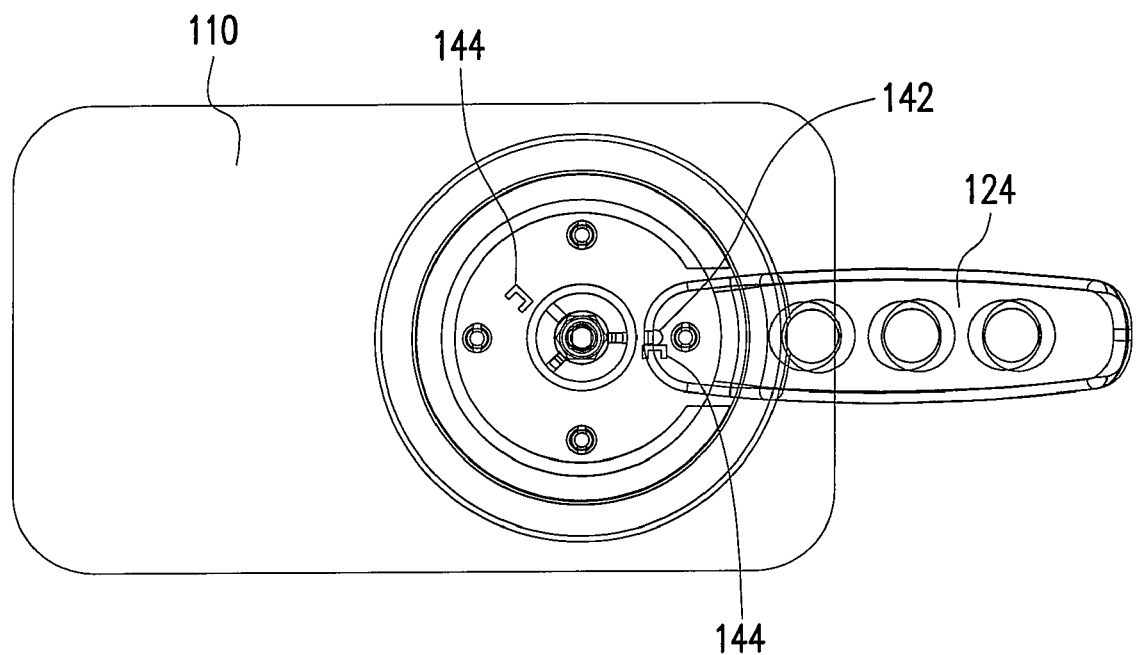
FIGS. 3A and 3B are schematic perspective views illustrating the rotatable support mechanism depicted in FIGS. 1A and 1B, respectively.
Figure 3B:
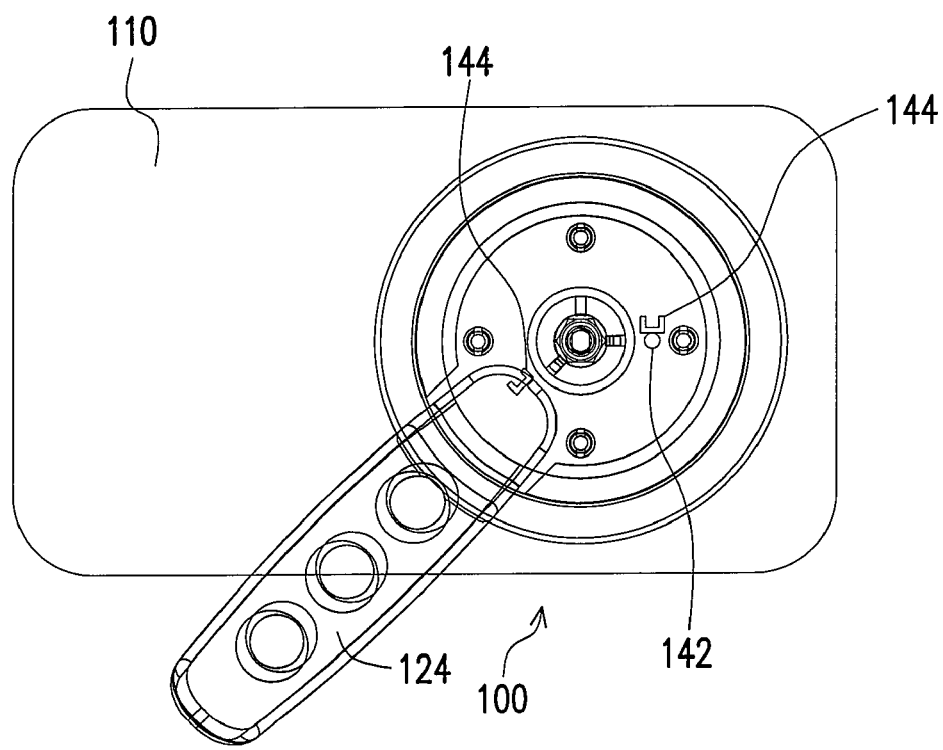

FIGS. 3A and 3B are schematic perspective views illustrating the rotatable support mechanism depicted in FIGS. 1A and 1B, respectively. Referring to FIGS. 2, 3A and 3B, the rotatable support mechanism 100 further includes a first rotatable stopper 142 and a plurality of second rotatable stoppers 144. The first rotatable stopper 142 is fittingly mounted to the base 110, while the second rotatable stoppers 144 are fittingly mounted to the rotatable disk 120 for controlling a rotation angle of the rotatable disk 120 relative to the base 110 in line with the first rotatable stopper 142.

In the present embodiment, the first rotatable stopper 142 is a protruding bump, whereas the second rotatable stoppers 144 are protruding ribs. Therefore, when the rotatable disk 120 is rotated relative to the base 110 by exerting a force to the holder 124, the first rotatable stopper 142 is blocked by one of the second rotatable stoppers 144, such that the rotatable disk 120 stops rotating relative to the base 110, whereby the fixed rotation angle of the rotatable disk 120 relative to the base 110 is given. As a result, the rotation angle of the rotatable disk 120 relative to the base 110 is controlled, so as to pose a limitation on possible locations where the holder 124 is placed relative to the base 110.

In the present embodiment, the elastic stopper 130 is used along with the first rotatable stopper 142 and the second rotatable stoppers 144. In addition, according to another embodiment not provided in the drawings of the present invention, the elastic stopper 130 can be individually used without utilizing the first rotatable stopper 142 and the second rotatable stoppers 144 together. Furthermore, according to still another embodiment not provided in the drawings of the present invention, the first rotatable stopper 142 and the second rotatable stoppers 144 can be adopted without simultaneously employing the elastic stopper 130.

To sum up, in the rotatable support mechanism and the electronic device applying the rotatable support mechanism proposed in the present invention, the holder of the rotatable disk is adopted for implementing a rotating operation. Moreover, the electronic device is fittingly placed in a desirable direction and at a satisfactory angle on account of the design of combining two of the rotatable stoppers and/or the elastic stopper. Thereby, the electronic device is apt to be upheld vertically or horizontally. Said design is especially adapted to the electronic device including the digital photo frame or the flat panel display for complying with the demand for upholding the electronic device in a vertical manner or a horizontal manner.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A rotatable support mechanism attached to a body of an electronic device, comprising:
   a base attached to the body and having an axle;
   a rotatable disk having a holder and a groove, the axle passing a sidewall of the groove, wherein the rotatable disk rotates around the axle as an axis, and the sidewall of the groove has at least an opening;
   an elastic stopper mounted to the axle and having an elastic shell fragment, wherein the elastic stopper does not rotate with the rotatable disk, and the elastic shell fragment enters and passes through the opening to exert a resistance force to the rotatable disk when the rotatable disk is rotated; and
   a cap nut screwed on a segment of an external thread of the axle for forcing the elastic stopper to exert an elastic force to the rotatable disk.

2. The rotatable support mechanism as claimed in claim 1, wherein the groove accommodates the elastic stopper.

3. The rotatable support mechanism as claimed in claim 1, further comprising:
   a first rotatable stopper fittingly mounted to the base; and
   a second rotatable stopper fittingly mounted to the rotatable disk for controlling a rotation angle of the rotatable disk relative to the base in line with the first rotatable stopper.

4. The rotatable support mechanism as claimed in claim 1, wherein the holder is extended from the rotatable disk to a direction away from the axle and the base.

5. The rotatable support mechanism as claimed in claim 1, further comprising:
   a constant force washer mounted to the axle and located between the cap nut and the elastic stopper for adjusting a force required by rotating the rotatable disk.

6. A rotatable support mechanism attached to a body of an electronic device, comprising:
   a base attached to the body and having an axle;
   a rotatable disk rotating around the axle as an axis and having a holder;
   a first rotatable stopper fittingly mounted to the base;
   a second rotatable stopper fittingly mounted to the rotatable disk for controlling a rotation angle of the rotatable disk relative to the base in line with the first rotatable stopper; and
   a cap nut screwed on a segment of an external thread of the axle for forcing an elastic stopper to exert an elastic force to the rotatable disk, wherein the elastic stopper is mounted to the axle and has at least an elastic shell fragment, the elastic stopper does not rotate with the rotatable disk, and the elastic shell fragment enters and passes through an opening to exert a resistance force to the rotatable disk when the rotatable disk is rotated.

7. The rotatable support mechanism as claimed in claim 6, wherein the rotatable disk comprises a groove, the axle passes a sidewall of the groove, and the sidewall of the groove comprises at least the opening.

8. The rotatable support mechanism as claimed in claim 7, wherein the groove accommodates the elastic stopper.

9. The rotatable support mechanism as claimed in claim 6, wherein the holder is extended from the rotatable disk to a direction away from the axle and the base.

10. The rotatable support mechanism as claimed in claim 6, further comprising:

a constant force washers mounted to the axle and located between the cap nut and the elastic stopper for adjusting a force required by rotating the rotatable disk.

* * * * *